United States Patent
Plamper et al.

[11] Patent Number: 6,085,509
[45] Date of Patent: Jul. 11, 2000

[54] SNAP ON GRASS BAG SLEEVE WITH SEWING STOP

[75] Inventors: Gerhard Plamper, Valley City; Nick E. Ciavarella, Cleveland, both of Ohio

[73] Assignee: MTD Products Inc

[21] Appl. No.: 08/748,552

[22] Filed: Nov. 8, 1996

Related U.S. Application Data

[63] Continuation of application No. 08/421,061, Apr. 12, 1995, abandoned.

[51] Int. Cl.[7] .................................................. A01D 34/12
[52] U.S. Cl. ............................ 56/202; 56/DIG. 9; 56/199
[58] Field of Search ............................ 56/202, 203, 199, 56/DIG. 9; 403/291, 283

[56] References Cited

U.S. PATENT DOCUMENTS

| | | | |
|---|---|---|---|
| 4,031,694 | 6/1977 | Gobin | 56/202 |
| 4,258,538 | 3/1981 | Morse | 56/202 |
| 4,574,568 | 3/1986 | Trelford | 56/202 |
| 4,726,177 | 2/1988 | McGoughy | 56/202 |
| 4,969,320 | 11/1990 | Langford | 56/202 |

*Primary Examiner*—Terry Lee Melius
*Assistant Examiner*—Heather Shackelford

[57] ABSTRACT

A grass bag sleeve is disclosed having a sewing section for interconnection to a fabric grass bag and an attachment section for snap-on interconnection to the frame of a grass bag opening.

33 Claims, 3 Drawing Sheets

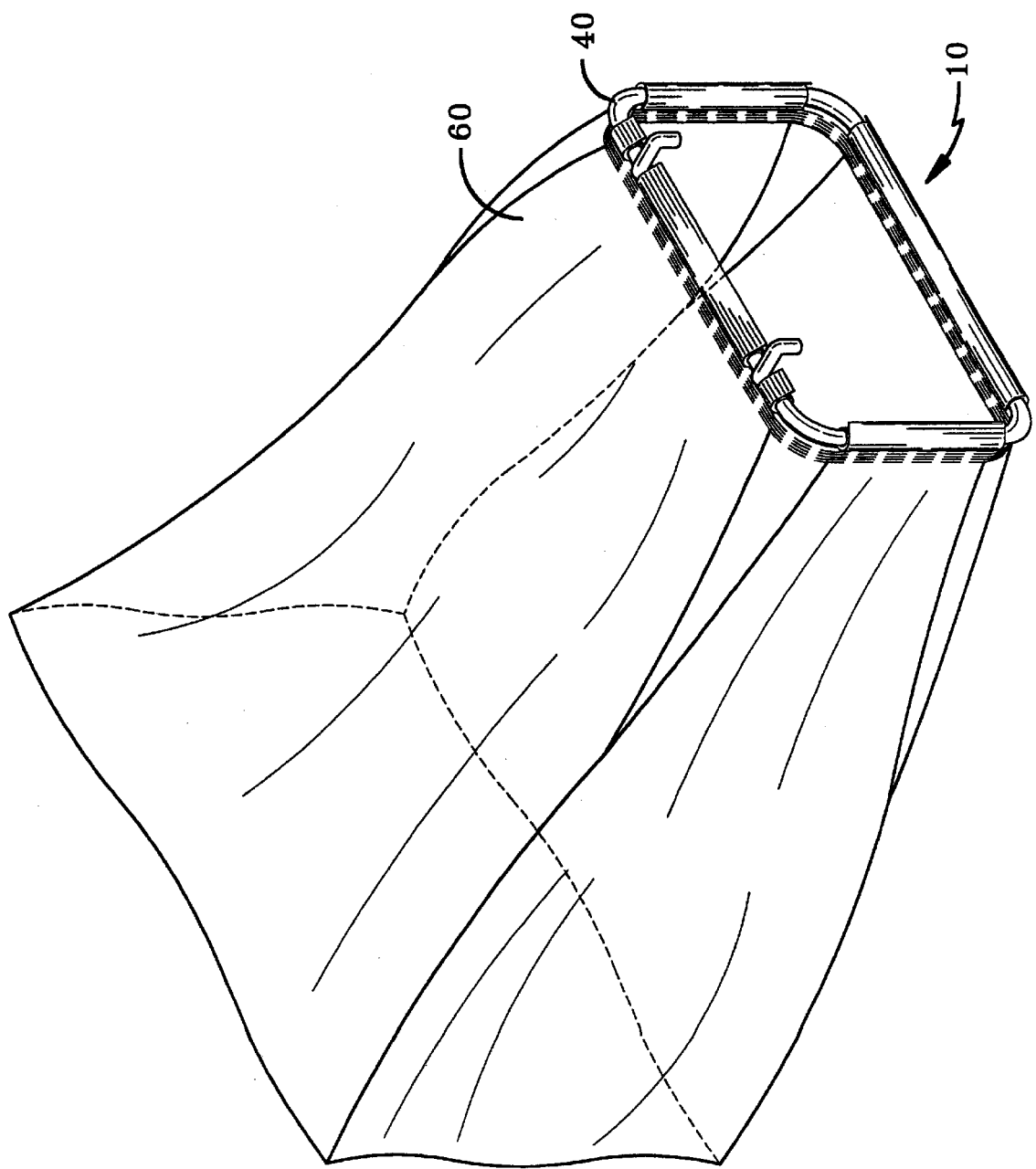

SNAP ON GRASS BAG SLEEVE WITH SEWING STOP

This is a continuation application of U.S. Ser. No. 08/421,061 filed Apr. 12, 1995 now abandoned.

FIELD OF THE INVENTION

This invention relates to a way of mounting a grass bag sleeve to a grass bag frame.

BACKGROUND OF THE INVENTION

Lawn and garden mowers typically have a grass bag assembly along the rear or side sections of a mowing deck for usage therewith. Typical methods of mounting these grass bag assemblies to the grass bag frame include trapping the edges of the grass bag between fixed steel bars and a frame (which may include the mower deck), molding a wire rod into the upper edges of the grass bag frame and sewing the grass bag to the grass bag frame.

OBJECTS AND SUMMARY OF THE INVENTION

It is an object of this invention to lower the cost of grass bag assemblies.

It is an object of the present invention to provide for a stronger interconnection between the grass bag and grass bag frame.

It is another object of the present invention to simplify the construction of a grass bag assembly.

It is still another object of the present invention to ease the assembly of a grass bag.

It is still a further object of this present invention to strengthen the interconnection between the grass bag frame and the grass bag.

Other objects and a more complete understanding of the present invention may be had by referring to the drawings.

BRIEF DESCRIPTION OF THE DRAWINGS

The structure, operation, and advantages of the presently preferred embodiment of the invention will become further apparent upon consideration of the following description taken in conjunction with the accompanying drawings, wherein:

FIG. 3 is an isometric view of a grass bag assembly for a walk behind lawn mower incorporating the invention of the application.

DETAILED DESCRIPTION OF THE INVENTION

Figure 1:
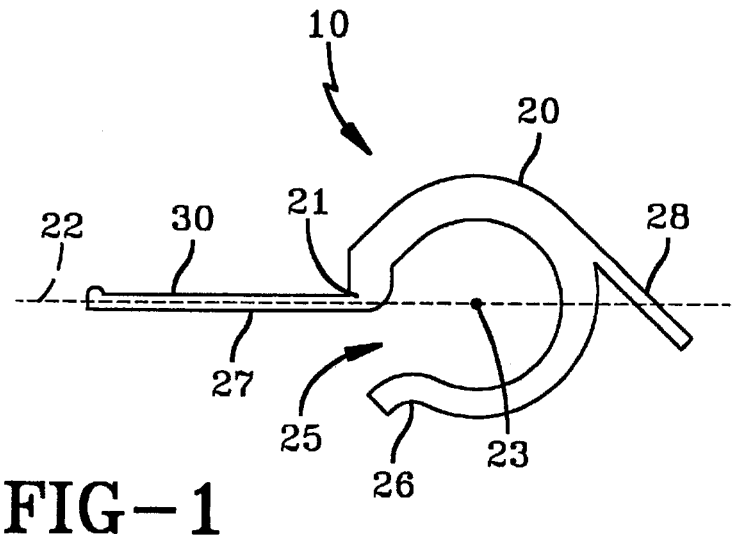
FIG. 1 is a side view, in cross section, of the grass bag sleeve of the invention. This view is taken substantially along Lines 1—1 in FIG. 2.

The grass bag sleeve of this invention is designed for use with a grass bag frame to connect the grass or debris bag to a grass bag frame having a desired shape and preferably also to allow for means of sealing attachment to the device. A typical device is a rear drive lawn mower such as the MTD Model 800. Other mowers and lawn and garden equipment could be substituted.

The invention of this application relates to an improved grass bag sleeve 10.

The preferred embodiment of the sleeve 10 includes an attachment section 20 and a sewing portion 30.

The attachment section 20 is designed for snap over interconnection with a grass bag frame 40, typically a rod or tube member.

The grass bag frame shown by way of example is a substantially "L" shaped rod or tube member 40 having a rectangular front opening frame 41 with a slightly upwardly extending top frame 42 extending off of the top of the opening frame 41. The two frames are integrally connected by welding. It is designed for a rear discharge lawn mower. Other grass bag frames and/or discharge locations could also be utilized with the invention.

The grass sleeve 10 is used to interconnect the grass bag 60 to the rod or tube member 40. The grass bag 60 itself is made of a porous material for collection of grass clippings from the lawn mower. Note that due to the preferred embodiment of the invention it is possible to ship the grass bag 60 separate from the grass bag frame 40, thus reducing shipping size and associated costs. Further the two are readily assembled at the ultimate destination by hand in an intuitive manner.

The snap over feature of the sleeve 10 is provided by having an opening 25 in the attachment section 20. The width of the opening 25 is designed to be less than the diameter of the rod or tube 40 so as to provide a snap over interconnection with the rod or tube 40 to be utilized therewith. Preferably, this opening 25 is located immediately adjacent to the interconnection 21 so as to optimize the amount of force that the attachment section 20 can withstand before ultimate separation from the rod or tube.

Any forces in the sleeve are preferably passed to approximately the middle point of the attachment section 20. This latter is accomplished by having the interconnection 21 between the attachment section 20 and the sewing section 30 occurring substantially congruent with a line 22 down through the center of the sewing section 30 and through the axial center 23 of the attachment section 20. With this design, any pulling separation force on the sleeve 10 will be passed to the entire attachment section 20. In specific any pulling separation force on the grass bag 60 will be passed to the attachment section 20 directly in line with the central axis of the attachment section 20. This optimizes the retention strength for the attachment section 20 in respect to the rod or tube 40. Note that the rod or tube 40 could have a non-circular cross section with the attachment section 20 suitably modified.

Preferably, this opening 25 is located immediately adjacent to the intersection 21 so as to optimize the amount of force that the attachment section 20 can withstand before ultimate separation from the rod or tube. Preferably, also, the inside diameter of the attachment section 20 is sized so as to allow this section 20, once installed, to pivot freely about the tube or rod 40. No screws, bolts, fittings, or clamps are necessary to install the sleeve.

In the preferred embodiment disclosed, the rod has a circular cross section with a diameter of approximately 0.312". For this dimension, the width of the opening in the preferred embodiment is substantially 0.094". A 30% to 60% ratio is preferred.

A small outwardly extending flange 26 located immediately adjacent to the opening 25 is preferably included. This flange 26 facilitates the installation of the sleeve 10 by providing for an inclined lead in edge for the opening 25, in combination with the other inclined lead in edge 27 on the other side of the opening 25. In the embodiment shown this other inclined lead in edge 27 is formed as part of the sewing section 30. It could be a separate member like 26. The angle of this flange 26 in respect to the opening 25 is preferably the same as the angle at the other side of the opening between the sewing section 30 and the attachment section 20. This symmetry would provide for an equalization of the forces on each side of the opening 25, thus facilitating installation. In the preferred embodiment disclosed, this angle is substantially 45°.

The entire sleeve 10 disclosed is formed of flexible PVC (GEON 83718-288) having a diameter. The attachment section 20 itself is approximately 0.340" inner diameter having a wall thickness which increases uniformly from 0.055" at the flange to 0.085" at the end of the attachment section 21. This gradual increase in thickness facilitates assembly of the attachment of the section 20 to the frame rod or tube 40. It also acts to insure that that the attachment section 20 is stiff enough not to allow the disunion of the sleeve from the rod or tube without a significant pull off force.

The preferred attachment section 20 shown incorporates a sealing flap 28 which seals the area between the grass bag assembly and the mower discharge chute, thus sealing this interface against air and clipping leakage. This sealing flap is optional depending on the sealing conditions of the specific mower application. If included it could be suitably modified if necessary for the particular application.

The sewing section 30 is the portion of the sleeve 10 to which the grass bag body itself is attached. The particular embodiment discloses a sewing attachment.

Other modes of attachment such as velcro, molding, extrusion, glue and such could also be used. In the preferred embodiment the sewing section 30 is thinner than the rest of the sleeve 10 to allow for ease of penetration of the sleeve during the sewing process. (The material of the grass bag aids in stiffening this section 30 after their union.)

This particular sewing section is 30 is 0.040" thick and about ¾" long. The length aids to the strength of the interconnection by allowing numerous rows of stitches 35 (instead of a single row for example).

As previously set forth preferably the sewing section 30 extends off of the center line of the attachment section 20 so as to optimize the strength of the interconnection to the frame 40.

Figure 4:
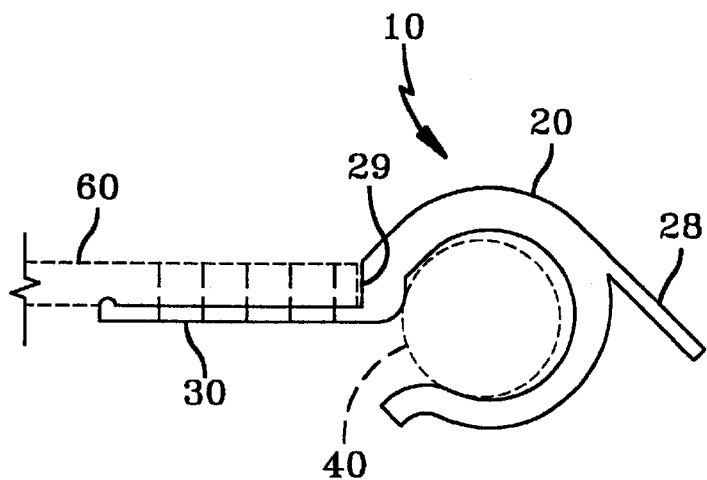
FIG. 4 is a side view like FIG. 1 representing the cooperation of the sleeve with the grass bag and grass bag frame.

The attachment section 20 preferably incorporates a sewing stop 29 which facilitates the locating of the grass bag material 60 during the sewing process by locating the material 60 to the sleeve 10 during the sewing operation (see FIG. 4).

The sewing stop 29 shown linearly aligns the material 60 of the grass bag for ease of sewing. Since the grass bag material 60 itself takes up the space along the top of the sewing section 30 to the sewing stop 29, the grass bag assembly is coincidentally aesthetically cleaner and crisper in appearance.

Figure 2:
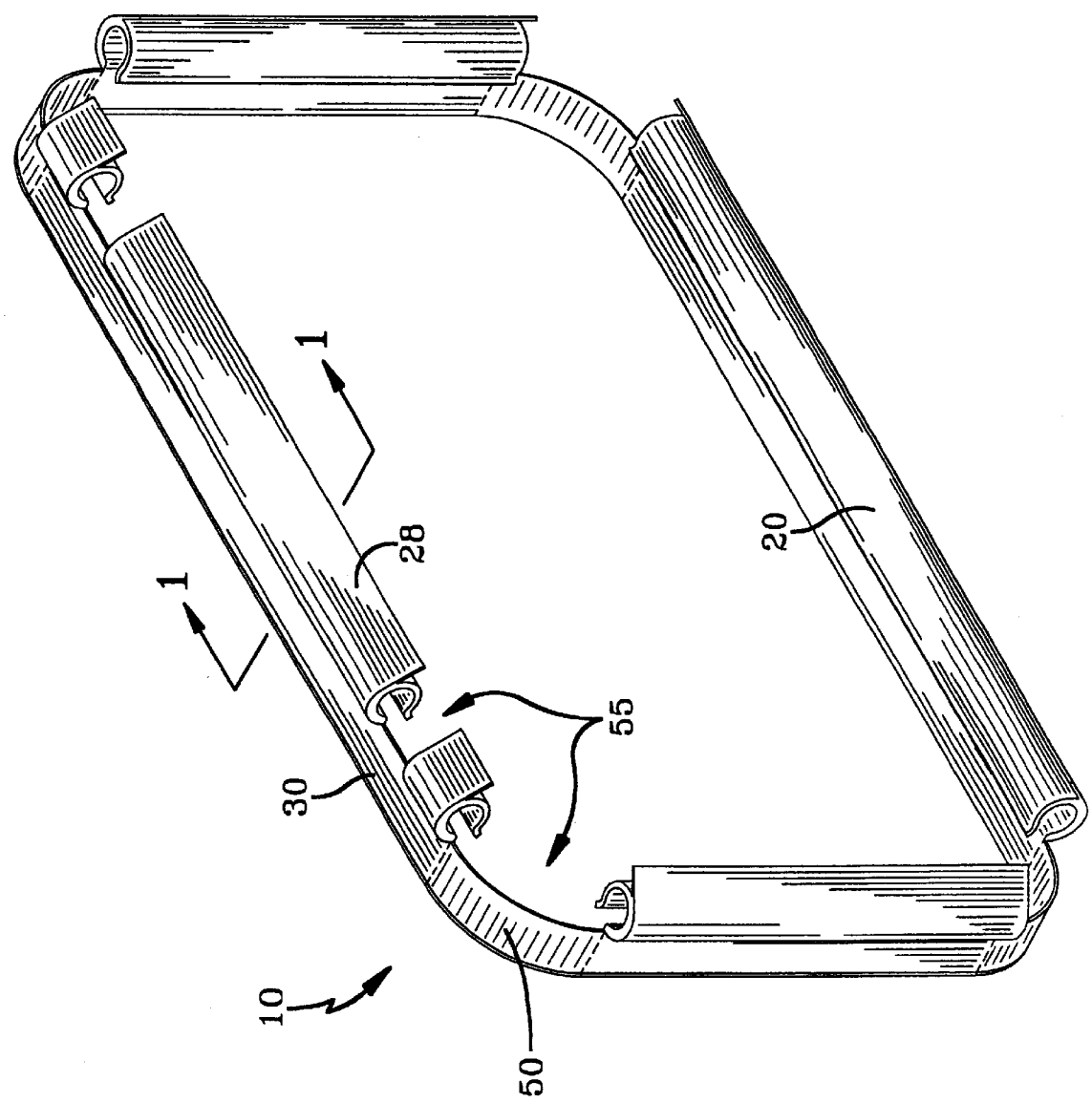
FIG. 2 is an isometric view of a certain grass bag sleeve ready for interconnection to the entrance of a grass bag.

Preferably the grass bag sleeve 10 is a continuous extrusion, suitably modified with cutouts and bends in order to match many differing applications with parts including those applicable to further differing lawn mowers, such as mounting brackets, handles, grass bags etc. For example, it can be seen in FIG. 2 that the entire sleeve 10 is of a single length modified by three bends 50 and four cutouts 55. By altering the location of these bends and cutouts, totally different shapes can be created by a single extrusion. This allows a manufacturer to minimize the number of extrusions across the product line merely by using differing stamping or other modification process afterwards. The use of a common extrusion reduces set up and manufacturing time as well.

No matter what the embodiment, after manufacture of the individual grass bag, it is snapped over the rod or tubing of the frame 40 by hand. This operation is facilitated by the angles of the flange 26 and the intersection 27 of the attachment section 20 with the sewing section 30.

Once installed, due to the fact that the attachment section 20 can swivel around the bag frame 40 in combination with the flexible properties of the sewing section 30, the forces on the attachment section 20 are minimized. Further any forces from the grass bag 60 passed to the center of the attachment section 20 where they can be efficiently absorbed.

Although the invention has been described in its preferred form in particular detail, it is to be understood that numerous changes can be made without deviating from the invention as hereinafter claimed.

Figure 5:
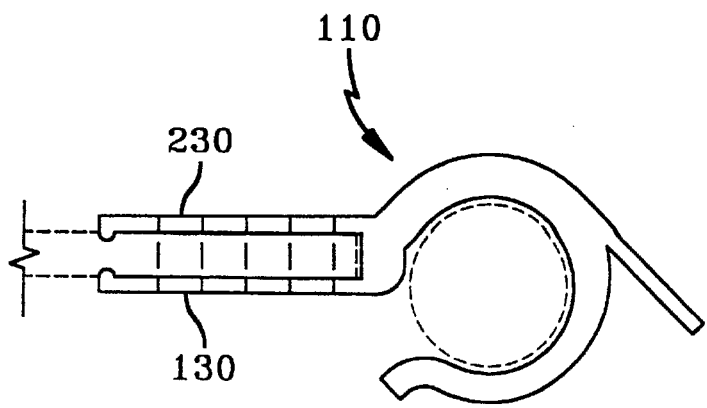
FIG. 5 is a side view like FIG. 1 of a modified grass bag sleeve.

For example the preferred grass bag sleeve 10 has been set forth for use at the entrance opening to a grass bag. The sleeve can also be used at other locations. For example the drawing of FIG. 5 discloses a modified sleeve 110 that utilizes two sewing sections 130, 230. This modified sleeve 110 could be used along the side edges of a grass bag. Other modifications are also possible.

Therefore, while the invention has been described in combination with embodiments thereof, it is evident that many alternatives, modifications, and variations will be apparent to those skilled in the art in light of the foregoing description. Accordingly, it is intended to embrace all such alternatives, modifications and variations which fall within the spirit and scope of the appended claims.

We claim:

1. A grass bag sleeve for use in combination with a grass bag having a grass bag frame having a member with an outer diameter and an inlet, the combination comprising a sleeve having a body, said body having an attachment section and connection section, said attachment section having a diameter and an opening, said diameter of said attachment section being greater than said diameter of the member of the grass bag frame, said diameter of said attachment section surrounding the member of the grass bag frame wherein the frame is located at the inlet of the grass bag, said opening of said attachment section being smaller than the diameter of the member of the grass bag frame, said connection section extending from said diameter of said attachment section radially outwardly as an extension of a line passing through the axial center of said attachment section, and the grass bag being connected to said connection section.

2. The improved combination of claim 1 characterized in that said opening is located immediately adjacent to the interconnection between said attachment section and said connection section.

3. A grass bag sleeve for use in combination with a grass bag having a grass bag frame having a member with an outer diameter, the combination comprising a sleeve having a body, said body having an attachment section and connection section, said attachment section having a diameter and an opening, said diameter of said attachment section being greater than said diameter of the member of the grass bag frame, said diameter of said attachment section surrounding the member of the grass bag frame wherein the frame is located at the inlet of the grass bag, said opening being located immediately adjacent to the interconnection between said attachment section and said connection section, said opening of said attachment section being smaller than the diameter of the member of the grass bag frame, said opening being approximately 30–60% of the diameter of said attachment section, said connection section extending from said diameter of said attachment section radially outwardly as an extension of a line passing through the axial center of said attachment section, and the grass bag being connected to said connection section.

4. The improved combination of claim 2 characterized in that said attachment section has a flange, said flange being on the other side of said opening from the interconnection between said attachment section and said connection section.

5. The combination of claim 4 characterized in that said flange contacts said attachment section at an angle, said connection interconnects with said attachment section at an angle, and said angle of said flange intersection is substantially the same as said angle of said connection intersection.

6. The combination of claim 1 characterized in that the grass bag is sewed to said connection section.

7. The combination of claim 1 characterized in that said connection section having a thickness, said attachment section having a thickness and said thickness of said connection section being less than said thickness of said attachment section.

8. A grass bag sleeve for use in combination with a grass bag having a grass bag frame having a member with an outer diameter, the combination being utilized in an application including a further part connected to the member of the grass bag frame, the combination comprising a sleeve having a body, said body having an attachment section and connection section, said attachment section having a diameter and an opening, said diameter of said attachment section being greater than said diameter of the member of the grass bag frame, said diameter of said attachment section surrounding the member of the grass bag frame, said opening of said attachment section being smaller than the diameter of the member of the grass bag frame, said connection section extending from said diameter of said attachment section radially outwardly as an extension of a line passing through the axial center of said attachment section, the grass baa being connected to said connection section, a cutout, said cutout being formed in said sleeve at the location of the further part and said cutout in the sleeve providing a clearance for the further part connected to the member of the grass bag frame.

9. The combination of claim 8 wherein there are a multiplicity of further parts connected to the member of the grass bag frame and characterized in that the sleeve has a multiplicity of cutouts to provide clearances for said multiplicity of parts respectively.

10. A grass bag sleeve for use in combination with a grass bag having a grass bag frame having a member with an outer diameter and an inlet, the combination comprising a sleeve having a body, said body having an attachment section and connection section, said attachment section having a diameter and an opening, said diameter of said attachment section being greater than said diameter of the member of the grass bag frame, said diameter of said attachment section surrounding the member of the grass bag frame wherein the frame is located at the inlet of the grass bag, said opening of said attachment section being smaller than the diameter of the member of the grass bag frame, said connection section extending from said diameter of said attachment section, said connection section having a thickness, said attachment section having a thickness, and said thickness of said connection section being less than said thickness of said attachment section, said connection section extending from said diameter of said attachment section radially outwardly as an extension of a line passing through the axial center of said attachment section, and the grass bag being connected to said connection section.

11. The improved combination of claim 10 characterized in that said opening is located immediately adjacent to the interconnection between said attachment section and said connection section.

12. A grass bag sleeve for use in combination with a grass bag having a grass bag frame having a member with an outer diameter, the combination comprising a sleeve having a body, said body having an attachment section and connection section, said attachment section having a diameter and an opening, said diameter of said attachment section being greater than said diameter of the member of the grass bag frame, said diameter of said attachment section surrounding the member of the grass bag frame, said opening of said attachment section being smaller than the diameter of the member of the grass bag frame, said opening being located immediately adjacent to the interconnection between said attachment section and said connection section, said opening being approximately 30–60% of the diameter of said attachment section, said connection section extending from said diameter of said attachment section, said connection section having a thickness, said attachment section having a thickness, and said thickness of said connection section being less than said thickness of said attachment section, said connection section extending from said diameter of said attachment section radially outwardly as an extension of a line passing through the axial center of said attachment section, and the grass bag being connected to said connection section.

13. The improved combination of claim 11 characterized in that said attachment section has a flange, said flange being on the other side of said opening from the interconnection between said attachment section and said connection section.

14. The combination of claim 13 characterized in that said flange contacts said attachment section at an angle, said connection interconnects with said attachment section at an angle, and said angle of said flange intersection is substantially the same as said angle of said connection intersection.

15. The combination of claim 10 characterized in that the grass bag is sewed to said connection section.

16. A grass bag sleeve for use in combination with a grass bag having a grass bag frame having a member with an outer diameter, the sleeve being utilized in an application including a further part connected to the member of the grass bag frame, the combination comprising a sleeve having a body, said body having an attachment section and connection section, said attachment section having a diameter and an opening, said diameter of said attachment section being greater than said diameter of the member of the grass bag frame, said diameter of said attachment section surrounding the member of the grass bag frame, said opening of said attachment section being smaller than the diameter of the member of the grass bag frame, said connection section extending from said diameter of said attachment section, said connection section having a thickness, said attachment section having a thickness, and said thickness of said connection section being less than said thickness of said attachment section, said connection section extending from said diameter of said attachment section radially outwardly as an extension of a line passing through the axial center of said attachment section, the grass bag being connected to said connection section, a cutout, said cutout being formed in said sleeve at the location of the further part and said cutout in the sleeve providing a clearance for the further part connected to the member of the grass bag frame.

17. The combination of claim 16 wherein there are a multiplicity of further parts connected to the member of the grass bag frame and characterized in that the sleeve has a multiplicity of cutouts to match said multiplicity of further parts.

18. The combination of claim 1 wherein the grass bag is used with a mower having a discharge chute and there is an area therebetween characterized by the addition of a sealing flap, said sealing flap extending off of said attachment section and said sealing flap sealing the area between the grass bag and the discharge chute.

19. The combination of claim 1 characterized by the interconnection between said connection section and said attachment section occurring substantially congruent with a line down the center of said connection section and through the axial center of said attachment section.

20. The combination of claim 1 characterized in that said grass bag sleeve is a continuous extrusion.

21. The combination of claim 20 wherein the member of the grass bag frame has an aggregate length and characterized in that said grass bag sleeve is a single continuous length matching the aggregate length of the member of the grass bag frame.

22. A grass bag sleeve for use in combination with a grass bag having a grass bag frame having a member with an outer diameter, the combination comprising a sleeve having a body, said body being a continuous extrusion having an attachment section and connection section, said attachment section having a diameter and an opening, said diameter of said attachment section being greater than said diameter of the member of the grass bag frame, said diameter of said attachment section surrounding the member of the grass bag frame, said opening of said attachment section being approximately 30–60% of said diameter of the member of the grass bag frame, said connection section extending from said diameter of said attachment section, said connection section having a thickness, said attachment section having a thickness, and said thickness of said connection section being less than said thickness of said attachment section, said connection section extending from said diameter of said attachment section radially outwardly as an extension of a line passing through the axial center of said attachment section, and the grass bag being connected to said connection section.

23. The combination of claim 22 wherein the sleeve is utilized in an application including a further part connected to the member of the grass bag frame and characterized by the addition of cutout, said cutout being formed in said sleeve at the location of the further part and said cutout in the sleeve providing a clearance for the further part connected to the member of the grass bag frame.

24. The combination of claim 23 wherein there are a multiplicity of further parts connected to the member of the grass bag frame and characterized in that the sleeve has a multiplicity of cutouts to match said multiplicity of further parts.

25. A grass bag sleeve for use in combination with a grass bag frame having a member with an outer diameter, the combination comprising the sleeve having a body, said body having an attachment section and connection section, said attachment section having an opening, said opening of said attachment section being approximately 30–60% of said diameter of said attachment section, said opening of said attachment section being smaller than the diameter of the member of the grass bag frame, said connection section extending from said diameter of said attachment section, and the grass bag being connected to said connection section.

26. The improved combination of claim 25 characterized in that said opening is located immediately adjacent to the interconnection between said attachment section and said connection section.

27. The improved combination of claim 26 characterized in that said attachment section has a flange, said flange being on the other side of said opening from the interconnection between said attachment section and said connection section.

28. The combination of claim 27 characterized in that said flange contacts said attachment section at an angle, said connection interconnects with said attachment section at an angle, and said angle or said flange intersection is substantially the same as said angle of said connection intersection.

29. The combination of claim 25 characterized in that said connection section having a thickness, said attachment section having a thickness and said thickness of said connection section being less than said thickness of said attachment section.

30. The combination of claim 25 characterized in that said body has two connection sections.

31. The combination of claim 25 wherein the grass bag is used with mower having a discharge chute and there is an area therebetween characterized by the addition of a sealing flap, said sealing flap extending off of said attachment section and said sealing flap sealing the area between the grass bag and the discharge chute.

32. The combination of claim 25 characterized in that said grass bag sleeve is a continuous extrusion.

33. The combination of claim 32 wherein the member of the grass bag frame has an aggregate length characterized in that said grass bag sleeve is a single continuous length matching the aggregate length of the member of the grass bag frame.

* * * * *